United States Patent
Hashimoto et al.

(10) Patent No.: US 11,136,655 B2
(45) Date of Patent: Oct. 5, 2021

(54) HEAT-RESISTANT ALLOY, AND REACTION TUBE

(71) Applicant: KUBOTA CORPORATION, Osaka (JP)

(72) Inventors: Kunihide Hashimoto, Hirakata (JP); Yohei Enjo, Hirakata (JP)

(73) Assignee: KUBOTA CORPORATION, Osaka (JP)

( * ) Notice: Subject to any disclaimer, the term of this patent is extended or adjusted under 35 U.S.C. 154(b) by 86 days.

(21) Appl. No.: 16/464,807

(22) PCT Filed: Oct. 30, 2018

(86) PCT No.: PCT/JP2018/040264
§ 371 (c)(1),
(2) Date: May 29, 2019

(87) PCT Pub. No.: WO2019/088075
PCT Pub. Date: May 9, 2019

(65) Prior Publication Data
US 2019/0345592 A1    Nov. 14, 2019

(30) Foreign Application Priority Data

Nov. 6, 2017  (JP) .............................. JP2017-213608
Apr. 24, 2018  (JP) .............................. JP2018-082803
Oct. 16, 2018  (JP) .............................. JP2018-194816

(51) Int. Cl.
*C22C 38/48* (2006.01)
*C22C 38/06* (2006.01)
(Continued)

(52) U.S. Cl.
CPC .............. *C22C 38/48* (2013.01); *C21D 6/004* (2013.01); *C22C 38/06* (2013.01); *C22C 38/12* (2013.01);
(Continued)

(58) Field of Classification Search
CPC ................................ C22C 38/48; C21D 6/004
(Continued)

(56) References Cited

U.S. PATENT DOCUMENTS

2011/0272070 A1   11/2011  Jakobi et al.
2011/0318593 A1   12/2011  Takahashi et al.
2014/0205802 A1   7/2014   Enjo et al.

FOREIGN PATENT DOCUMENTS

CN   102187003 A    9/2011
EP   2 829 628 A1   1/2015
(Continued)

OTHER PUBLICATIONS

Japanese Patent Office, "International Search Report" (with English language translation), from corresponding International Application No. PCT/JP2018/040264, dated Dec. 25, 2018, 3 pp.
(Continued)

*Primary Examiner* — Weiping Zhu
(74) *Attorney, Agent, or Firm* — Eckert Seamans Cherin & Mellott, LLC

(57) ABSTRACT

The present invention provides a heat-resistant alloy and a reaction tube having excellent oxidation resistance, excellent mechanical properties such as tensile ductility, and weldability. A heat-resistant alloy of the present invention comprises, in terms of % by mass, C: 0.35% to 0.7%, Si: more than 0% and 1.5% or less, Mn: more than 0% and 2.0% or less, Cr: 22.0% to 40.0%, Ni: 25.0% to 48.3%, Al: 1.5% to 4.5%, Ti: 0.01% to 0.6%, and the balance being Fe and inevitable impurities, wherein when $Pa=-11.1+28.1\times C+29.2\times Si-0.25\times Ni-45.6\times Ti$, and $Ya=-13.75\times Al+63.75$, $Pa<Ya$.

18 Claims, 1 Drawing Sheet

(51) Int. Cl.
  *C22C 38/12* (2006.01)
  *C21D 6/00* (2006.01)
  *C22C 38/50* (2006.01)

(52) U.S. Cl.
  CPC ........ *C22C 38/50* (2013.01); *C21D 2211/001* (2013.01)

(58) Field of Classification Search
  USPC .......................................................... 420/16
  See application file for complete search history.

(56) References Cited

FOREIGN PATENT DOCUMENTS

| | | |
|---|---|---|
| EP | 3 539 714 A1 | 9/2019 |
| JP | SHO 50-93817 | 7/1975 |
| JP | SHO 52-78612 | 7/1977 |
| JP | SHO 57-39159 A | 3/1982 |
| JP | HEI 9-243284 A | 9/1997 |
| JP | 2013-227655 A | 11/2013 |
| JP | 2016-132019 A | 7/2016 |
| JP | 2016132019 A * | 7/2016 |
| KR | 10-2011-0132359 A | 12/2011 |

OTHER PUBLICATIONS

Korean Intellectual Property Office, "Office Action", from corresponding Korean patent application No. 10-2019-7015536 (includes English language translation) dated Mar. 25, 2021, 6 pp.

China National Intellectual Property Administration, "Chinese Office Action", from corresponding Chinese patent application No. 201880004729.2, dated Oct. 10, 2020, 7 pp.

European Patent Office, "Extended European Search Report", for corresponding European patent application No. EP 18873730.8, dated Dec. 21, 2020, 9 pp.

\* cited by examiner

HEAT-RESISTANT ALLOY, AND REACTION TUBE

TECHNICAL FIELD

The present invention relates to a heat-resistant alloy used for, for example, a reaction tube for producing a hydrocarbon gas, and more specifically to a heat-resistant alloy which can suitably form an Al oxide layer on the surface.

BACKGROUND ART

Olefin hydrocarbons such as ethylene and propylene and styrene hydrocarbons such as styrene monomers are produced by flowing a hydrocarbon raw material gas and vapor fluid in a reaction tube which is heated from the outside and thermally decomposing the raw material fluids by heating to the reaction temperature range in an apparatus for thermal decomposition.

Reaction tubes are exposed to high temperature atmosphere and susceptible to, for example, oxidation, carburization or nitridation by the flowing raw material gas and the like, and thus are required to have excellent resistance to them. For this reason, heat-resistant austenite alloys having excellent high temperature strength have been used for reaction tubes.

A metal oxide layer is formed on the surface of a heat-resistant austenite alloy during use in a high temperature atmosphere, and this oxide layer serves as a barrier to protect base materials in the high temperature atmosphere. Meanwhile, when Cr in the base material is oxidized to form a metal oxide, which is Cr oxide (mainly composed of $Cr_2O_3$), internal oxidation may occur in a high temperature atmosphere and thus the oxide layer may be enlarged because Cr oxide is not dense and thus does not have a sufficient function to prevent entering of oxygen or carbon. Furthermore, Cr oxide is easily peeled off in repeated cycles of heating and cooling, and even if not peeled off, since Cr oxide does not have sufficient function to prevent entering of oxygen or carbon from outside atmosphere, there is such a disadvantage that oxygen or carbon penetrates through the oxide layer to cause internal oxidization or carburization in the base material.

To address this, increasing the content of Al from that of usual heat-resistant austenite alloys and forming, on the surface of a base material, an oxide layer mainly composed of alumina ($Al_2O_3$), which is dense and less likely to permeate oxygen or carbon, has been proposed (see, for example, Patent Literature 1 and Patent Literature 2).

CITATION LIST

Patent Literature

[Patent Literature 1] Japanese Patent Laid-Open No. 52-78612
[Patent Literature 2] Japanese Patent Laid-Open No. 57-39159

SUMMARY OF INVENTION

Technical Problem

However, an increased Al content in a reaction tube causes a reduced ductility of the material, leading to a reduction in high temperature strength. Furthermore, when, in some cases, a plurality of tubular bodies are welded to increase the total length of a reaction tube, a large Al content may reduce weldability of tubular bodies to cause weld cracking.

An object of the present invention is to provide a heat-resistant alloy and a reaction tube having excellent oxidation resistance, mechanical properties such as tensile ductility, and weldability.

Solution to Problem

The heat-resistant alloy of the present invention comprises,
in terms of % by mass,
C: 0.35% to 0.7%,
Si: more than 0% and 1.5% or less,
Mn: more than 0% and 2.0% or less,
Cr: 22.0% to 40.0%,
Ni: 25.0% to 48.3%,
Al: 1.5% to 4.5%,
Ti: 0.01% to 0.6%, and
the balance being Fe and inevitable impurities, wherein, when $Pa=-11.1+28.1 \times C+29.2 \times Si-0.25 \times Ni-45.6 \times Ti$, and $Ya=-13.75 \times Al+63.75$, $Pa<Ya$.

The heat-resistant alloy of the present invention further comprises,
in terms of % by mass,
a rare earth element (REM): 0.01% to 0.2% and
the Pa is $Pa=-11.1+28.1 \times C+29.2 \times Si-0.25 \times Ni-45.6 \times Ti+18.0 \times REM$.

The heat-resistant alloy of the present invention further comprises,
in terms of % by mass,
Nb: 0.01% to 2.0%, and
the Pa is,
when the rare earth element (REM) is not included, $Pa=-11.1+28.1 \times C+29.2 \times Si-0.25 \times Ni-45.6 \times Ti-16.6 \times Nb$, and when the rare earth element (REM) is included, $Pa=-11.1+28.1 \times C+29.2 \times Si-0.25 \times Ni-45.6 \times Ti+18.0 \times REM-16.6 \times Nb$.

The heat-resistant alloy of the present invention further comprises,
in terms of % by mass,
at least one selected from the group of W: more than 0% and 1.0% or less and Mo: more than 0% and 0.5% or less.

It is desirable that an Al oxide layer is formed on the surface of the heat-resistant alloy of the present invention.

The heat-resistant alloy of the present invention may be a centrifugally cast body.

It is suitable that the heat-resistant alloy of the present invention is used in a high temperature atmosphere of 500° C. to 1150° C.

The reaction tube of the present invention comprises a tubular body comprising a heat-resistant alloy having the above structure.

The reaction tube of the present invention is prepared by joining the above tubular bodies to each other by welding.

Advantageous Effects of Invention

The heat-resistant alloy according to the present invention contains Al, and thus Al more preferentially forms Al oxide than Cr, and formation of Cr oxide can be suppressed. Therefore, the problem of, for example, peeling of Cr oxide can be suppressed. Furthermore, since the amount of Al added is as small as 1.5% to 4.5%, reduction in mechanical properties can be suppressed.

Moreover, due to the small amount of Al added, the heat-resistant alloy of the present invention has excellent weldability, and thus even when heat-resistant alloys are welded, occurrence of weld cracking and the like can be suppressed.

The tubular body prepared by the heat-resistant alloy of the present invention has excellent oxidation resistance and excellent weldability, and therefore a reaction tube prepared by welding the tubular bodies is very suitable as a reaction tube for producing olefin hydrocarbon and styrene hydrocarbon in a high temperature environment of 500° C. to 1100° C.

DESCRIPTION OF EMBODIMENTS

Figure 1:
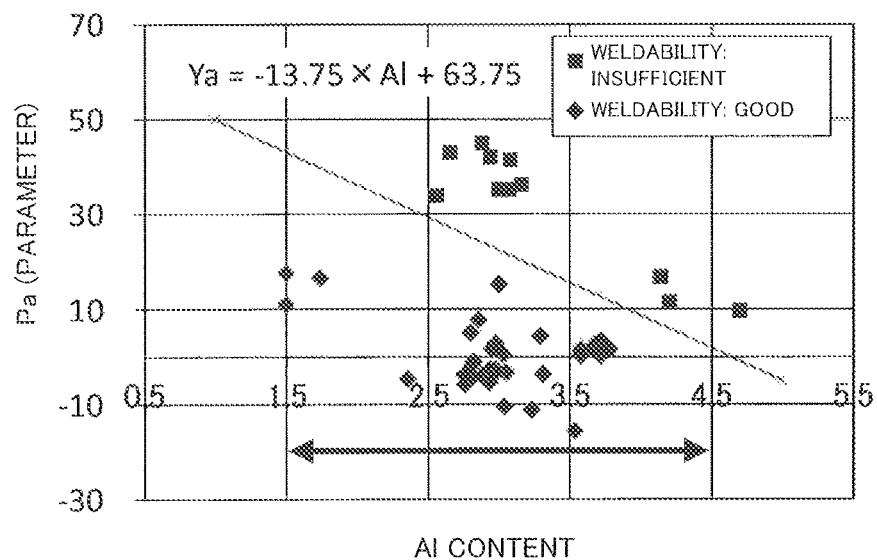
FIG. 1 shows a graph illustrating the results of a regression analysis of specimens for weldability, with the Pa value on the vertical axis and the Al content on the horizontal axis.

Hereinafter, embodiments of the present invention will be described in detail. "%" means % by mass unless otherwise specified.

The heat-resistant alloy of the present invention is formed into a tube shape to constitute a tubular body, and tubular bodies may be welded and used as a reaction tube. The reaction tube, through which a hydrocarbon gas raw material or the like is passed, is heated from the outside to be used for producing hydrocarbon such as olefins including ethylene, and styrene.

The heat-resistant alloy comprises,
in terms of % by mass,
C: 0.35% to 0.7%,
Si: more than 0% and 1.5% or less,
Mn: more than 0% and 2.0% or less,
Cr: 22.0% to 40.0%,
Ni: 25.0% to 48.3%,
Al: 1.5% to 4.5%,
Ti: 0.01% to 0.6%, and
the balance being Fe and inevitable impurities, wherein when $Pa=-11.1+28.1 \times C+29.2 \times Si-0.25 \times Ni-45.6 \times Ti$, and $Ya=-13.75 \times Al+63.75$, $Pa<Ya$.

In the following, the reason for limiting components will be described.

C: 0.35% to 0.7%

C has the function of improving casting properties and increasing high temperature creep rupture strength. C, which is bonded to, for example, Ti, Nb or Cr to form carbide, also has the effect of increasing high temperature strength. Thus, at least 0.35% of C is included. However, when the content is very high, primary carbide, $Cr_7C_3$, is likely to be widely formed, inhibiting transfer of Al to the inner surface of the reaction tube. Then the amount of Al to be supplied becomes insufficient, and thus formation of Al oxide such as $Al_2O_3$ is suppressed. Furthermore, since secondary carbide excessively precipitates, ductility and toughness are reduced. For this reason, the upper limit is 0.7%. The content of C is more desirably 0.35% to 0.5%.

Si: more than 0% and 1.5% or less

Si is included so as to serve as a deoxidizer for molten alloy, and increase flowability of molten alloy and improve oxidation resistance. However, addition of an excessive Si causes a reduction in ductility, a reduction in high temperature creep rupture strength, degradation of the quality of the surface after casting, and a reduction in weldability. For this reason, the upper limit of the content of Si is 1.5%. The content of Si is more desirably 1.0% or less.

Mn: more than 0% and 2.0% or less

Mn is included so as to serve as a deoxidizer for molten alloy and immobilize S in molten metal to improve weldability and improve ductility. However, addition of an excessive Mn causes a reduction in high temperature creep rupture strength and reduces oxidation resistance, and thus the upper limit is 2.0%. The content of Mn is more desirably 1.0% or less.

Cr: 22.0% to 40.0%

Cr contributes to the improvement of high temperature strength and repeated oxidation resistance. Cr exhibits excellent heat resistance in high temperature ranges of more than 1000° C. together with Ni, Fe, and produces primary carbide with C, N to improve high temperature creep rupture strength. Cr forms an oxide layer together with Al, providing the heat-resistant alloy with properties excellent in oxidation resistance and corrosion resistance. Thus, at least 22.0% or more of Cr is included. However, the upper limit of the content is 40.0%, since excessive production of Cr carbide and Cr nitride causes a reduction in ductility. The content of Cr is more desirably 22.0% to 36.0%.

Ni: 25.0% to 48.3%

Ni is an element necessary for securing repeated oxidation resistance and stability of the metal structure, securing high temperature creep strength, and stabilizing austenization of the heat-resistant alloy. Ni also contributes to improvement of high temperature strength and oxidation resistance together with Cr. Furthermore, when the content of Ni is small, the content of Fe is relatively increased, inhibiting production of Al oxide. For this reason, at least 25.0% or more of Ni is included. However, even if an excessive Ni is added, the effect becomes saturated and such addition is economically disadvantageous, and thus the upper limit is 52.0%. The content of Ni is more desirably 29.0% to 50.0%. The upper limit of the content of Ni is suitably 48.3%, and more desirably 46.0%.

Al: 1.5% to 4.5%

Al is an element essential for forming Al oxide in the heat-resistant alloy. Formation of Al oxide improves carburization resistance and coking resistance of heat-resistant alloy together with Cr oxide. Al also forms γ' phase together with Ni, strengthening the austenite phase of the heat-resistant alloy. For this reason, 1.5% or more of Al is included. However, excessive addition of Al causes a reduction in ductility and makes γ' phase unstable, leading to production of embrittlement phase. Furthermore, excessive addition of Al causes deterioration of casting properties and reduces cleanliness of the heat-resistant alloy. Thus, the upper limit is 4.5%. The content of Al is more desirably 2.0% to 4.0%.

Ti: 0.01% to 0.6%

Ti is an element which easily forms carbide and is an essential element which contributes to the improvement of creep rupture strength and the improvement of high temperature tensile strength. Thus, 0.01% or more of Ti is included. However, excessive addition of Ti causes a reduction in ductility, accelerates production of Ti oxide and reduces cleanliness of the heat-resistant alloy. Thus, the upper limit is Ti: 0.6%. The content of Ti is more desirably 0.05% to 0.30%.

Furthermore, for the respective elements contained in the heat-resistant alloy, when Pa=−11.1+28.1×C+29.2×Si−0.25×Ni−45.6×Ti+18.0×REM, and Ya=−13.75×Al+63.75, Pa<Ya.

For Pa, when an element described above is not included, the value of the element is treated as 0.

When Pa and Ya satisfy the above equation, weldability and oxidation resistance of the heat-resistant alloy (formation of Al oxide layer) can be ensured.

Pa described above is an equation for the content of the elements C, Si, Ni, Ti. For Pa, specimens with a varying content of these elements and a varying content of Al were prepared, and data for weldability of the specimens was obtained based on a bead-on-plate test, and Pa is derived from calculation of the influence coefficient of elements which affect weldability by regression analysis from the resulting data.

For Pa, referring to the influence coefficient, C and Si, which have a positive influence coefficient, are each an element which has an adverse effect on weldability. The larger the value (absolute value), the larger the extent of the adverse effect. Ni and Ti, which have a negative influence coefficient, are an element which improves weldability. The larger the value (absolute value), the greater the good impact.

FIG. 1 shows a graph plotting Pa of specimens on the vertical axis and their Al content on the horizontal axis. Those with good weldability are plotted with a diamond and those with poor weldability are plotted with a square. For the specimens to form a good Al oxide layer and have oxidation resistance, the target range of the content of Al is as described above (Al: 1.5% to 4.5%).

Referring to FIG. 1, for Pa and the content of Al at which a good Al oxide layer is formed, it is shown that there is a clear distinction of the region between the group with excellent weldability and the group with insufficient weldability. This graph shows that a clear correlation was successfully found between the content of Al and Ya based on weldability.

Then, line Ya: =−13.75×Al+63.75 which separates those groups based on the content of Al can be determined. More specifically, this shows that when Pa<Ya is satisfied in the range of Al: 1.5% to 4.5%, a heat-resistant alloy having not only excellent weldability but also excellent oxidation resistance can be obtained.

The following elements may be additionally included in the heat-resistant alloy as necessary.

Rare earth elements (REM): 0.01% to 0.2%

REM means 18 elements including 15 elements of the lanthanide series of La to Lu, and Y, Hf and Sc in the periodic table. The main REMs contained in the heat-resistant alloy may be Ce, La and Nd. The three elements account for preferably about 80% or more, and more preferably about 90% or more in total based on the total amount of the rare earth elements. REMs contribute to the stabilization of Al oxide layer and can improve adhesiveness of the Al oxide layer because they are an active metal. Furthermore, it is desirable to include REMs because they prevent spalling fracture of oxide layers associated with change in temperature and further form a solid solution with the base material to contribute to the improvement of oxidation resistance. 0.01% of more of REM is included so as to produce such effects. However, the upper limit is 0.2% because REMs form oxide preferentially, causing a reduction in cleanliness of the base material and ductility. The content of REMs is more desirably 0.01% to 0.18%.

When an REM is included in the heat-resistant alloy, the above Pa is

Pa=−11.1+28.1×C+29.2×Si−0.25×Ni−45.6×Ti+18.0×REM.

At least one selected from the group consisting of W: more than 0% and 1.0% or less and Mo: more than 0% and 0.5% or less W, Mo are an element which forms a solid solution with a base material and has a common characteristic of strengthening the austenite phase of the base material to improve creep rupture strength, and one or both of them is desirably included. However, excessive inclusion of W, Mo causes a reduction in ductility and carburization resistance, and inhibits formation of Al oxide particularly when Al oxide is produced at a temperature of 1050° C. or less. Excessive inclusion of W, Mo also causes a reduction in oxidation resistance of the base material. Mo exhibits twice the action of W in terms of equivalents. Thus, the upper limit of W is 1.0% and the upper limit of Mo is 0.5%.

Nb: 0.01% to 2.0%

Nb is an element which easily forms carbide and contributes to the improvement of creep rupture strength and the improvement of high temperature tensile strength. Nb also contributes to the improvement of aging ductility. Thus, 0.01% or more, and desirably 0.1% or more of Nb is included. However, excessive addition of Nb causes a decrease in ductility, a reduction in peeling resistance of Al oxide layer, and a reduction in oxidation resistance. Thus, the upper limit of Nb is 2.0%, and desirably 1.6%.

In that case, Pa described above is, when no rare earth element (REM) is included, Pa=−11.1+28.1×C+29.2×Si−0.25×Ni−45.6×Ti−16.6×Nb, and when a rare earth element (REM) is included, Pa=−11.1+28.1×C+29.2×Si−0.25×Ni−45.6×Ti+18.0×REM−16.6×Nb.

The influence coefficient of Nb in Pa is negative, and Nb is an element which improves weldability and has a good impact on weldability.

The heat-resistant alloy may be a tubular body constituted by a centrifugally cast body, which is formed into a tube shape by centrifugal casting, for example. The tubular body may be constituted in the form of a straight tube, a U-shaped tube, and the like. These may be welded to prepare a reaction tube. The tubular body made of the heat-resistant alloy of the present invention has excellent weldability, and thus tubular bodies can be welded in a satisfactory manner while suppressing occurrence of weld cracking and the like, and the reaction tube obtained has sufficient joining strength and mechanical properties.

It is desirable that an Al oxide layer is formed on the inner surface of the reaction tube in order to suppress carburization and coking of hydrocarbon gas. The Al oxide layer may be formed by performing a treatment for forming an Al oxide layer. The treatment for forming an Al oxide layer may be performed by heat-treating the tubular body or the reaction tube in an oxidizing atmosphere in a separate step, or performed in a high temperature atmosphere employed in an apparatus for thermal decomposition.

It is suitable that the treatment for forming an Al oxide layer is performed by heat-treating the heat-resistant alloy in an oxidizing gas containing 1% by volume or more of oxygen or an oxidizing atmosphere in which steam and $CO_2$ are mixed, at a temperature of 900° C., desirably 1000° C., and more desirably 1050° C. or more. In that case, 1 hour or more is suitable.

The treatment for forming an Al oxide layer allows the inner surface of the tubular body to be in contact with oxygen, and Al, Cr, Ni, Si and Fe, for example, which have been diffused into the surface of a base material, are oxidized to form an oxide layer. If heat treatment is performed in the above temperature range at that stage, Al forms an oxide preferentially to Cr, Ni, Si, Fe. Furthermore, part of Al in the base material is transferred to the surface to constitute an oxide, thereby forming an Al oxide layer mainly composed of $Al_2O_3$.

Formation of an Al oxide layer on the inner surface of the reaction tube allows the reaction tube to exhibit excellent oxidation resistance when used in a high temperature atmosphere. Therefore, the reaction tube is suitable for the application in which olefin or styrene hydrocarbon is produced by passing and thermally decomposing hydrocarbon gas at 500° C. to 1100° C.

EXAMPLES

Specimens (25 mm-thick or less or 25 mm-thick or more) having a composition of alloy shown in Table 1 (unit: % by mass, the balance being Fe and inevitable impurities) were each prepared by centrifugal casting. A bead-on-plate test was performed according to the following procedure and cracking properties in welding were examined. Inventive Examples are specimens Nos. 11 to 23, and Comparative Examples are specimens Nos. 31 to 38. In Table 1, REM represents the total amount of Ce, La and Y. While the Inventive Examples all fall within the range of the composition of components of the present invention, for Comparative Examples, elements which are outside of the composition of components of the present invention are marked with "*." More specifically, W is excessive in specimen No. 31, specimens No. 32 and No. 33 do not contain Ti, REM is excessive in No. 33, Si is excessive in Nos. 34 to 36, Al is excessive in No. 37, and No. 38 is a Comparative Example which satisfies the composition of alloy of the present invention, but does not satisfy Pa<Ya as described below.

TABLE 1

| Specimen No. | C | Si | Mn | Cr | Ni | Al | Ti | Nb | Ce | La | Nd | REM (total) | W | Pa | Ya | Pa < Ya | Cracking properties | Rating |
|---|---|---|---|---|---|---|---|---|---|---|---|---|---|---|---|---|---|---|
| 11 | 0.36 | 0.30 | 0.14 | 23.14 | 32.72 | 2.93 | 0.11 | | 0.09 | | | 0.09 | | −3.80 | 23.46 | ✓ | A | A |
| 12 | 0.48 | 0.29 | 0.21 | 32.69 | 43.55 | 3.54 | 0.11 | 0.8 | | 0.15 | | 0.15 | | −15.6275 | 15.08 | ✓ | B | A |
| 13 | 0.40 | 0.23 | 0.13 | 23.76 | 32.64 | 2.76 | 0.10 | | 0.11 | | | 0.11 | 0.80 | −3.88 | 25.80 | ✓ | A | A |
| 14 | 0.47 | 0.25 | 0.12 | 23.76 | 33.66 | 3.31 | 0.09 | 0.09 | | 0.05 | | 0.05 | 0.98 | −3.706 | 18.24 | ✓ | B | A |
| 15 | 0.45 | 0.22 | 0.12 | 23.7 | 34.16 | 3.23 | 0.07 | 0.56 | | 0.1 | | 0.1 | 0.96 | −11.259 | 19.34 | ✓ | B | A |
| 16 | 0.42 | 0.36 | 0.19 | 24.06 | 35.24 | 2.97 | 0.11 | | | 0.01 | | 0.01 | 0.93 | −2.432 | 22.91 | ✓ | B | A |
| 17 | 0.43 | 0.35 | 0.19 | 32.19 | 33.63 | 2.88 | 0.15 | | | 0.01 | | 0.01 | 0.85 | −3.8645 | 24.15 | ✓ | B | A |
| 18 | 0.38 | 0.37 | 0.19 | 22.96 | 41.16 | 2.93 | 0.06 | | | 0.01 | | 0.01 | 0.9 | −2.464 | 23.46 | ✓ | B | A |
| 19 | 0.47 | 0.39 | 0.2 | 27.57 | 41.7 | 3.04 | 0.06 | 0.6 | | 0.01 | | 0.01 | 0.96 | −10.358 | 21.95 | ✓ | B | A |
| 20 | 0.42 | 0.29 | 0.17 | 23.1 | 33.3 | 3.09 | 0.08 | 0.03 | | | | | 0.97 | −3.3 | 21.30 | ✓ | A | A |
| 21 | 0.47 | 0.39 | 0.2 | 27.6 | 41.7 | 3.04 | 0.08 | 0.6 | | | | | 0.96 | −10.5 | 22.00 | ✓ | A | A |
| 22 | 0.4 | 0.25 | 0.46 | 29.3 | 47.3 | 3.67 | 0.12 | 0.73 | | | | | | −22 | 13.30 | ✓ | A | A |
| 23 | 0.45 | 0.26 | 0.45 | 29.7 | 48.3 | 3.61 | 0.11 | 1.44 | | | | | | −31.9 | 14.10 | ✓ | A | A |
| 31 | 0.45 | 0.31 | 0.12 | 22.54 | 32.4 | 3.77 | 0.1 | | 0.11 | | | 0.11 | *3.45 | −0.083 | 11.91 | ✓ | C | B |
| 32 | 0.45 | 0.7 | 0.1 | 24 | 33 | 2.8 | * | | 0.15 | | | 0.15 | 0.8 | 16.435 | 25.25 | ✓ | C | B |
| 33 | 0.4 | 0.8 | 1 | 25 | 35 | 4.14 | * | | 0.21 | 0.11 | 0.063 | *0.383 | | 21.644 | 6.83 | | C | B |
| 34 | 0.62 | *1.85 | 0.98 | 32.4 | 42.3 | 3.55 | 0.12 | 0.3 | 0.03 | 0.01 | | 0.04 | 0.2 | 40.035 | 14.94 | | C | B |
| 35 | 0.61 | *1.73 | 1.02 | 31.5 | 43.6 | 4.01 | 0.11 | 0.4 | 0.01 | | | 0.01 | 0.3 | 34.181 | 8.61 | | C | B |
| 36 | 0.65 | *1.95 | 0.78 | 29.2 | 41.6 | 3.85 | 0.06 | 0.2 | 0.04 | 0.01 | | 0.05 | 0.5 | 48.549 | 10.81 | | C | B |
| 37 | 0.39 | 0.39 | 0.35 | 25.6 | 35.8 | *5.92 | 0.13 | 0.85 | | | | | 0.75 | −17.741 | −17.65 | ✓ | C | B |
| 38 | 0.35 | 1.39 | 0.45 | 29.5 | 48.1 | 3.84 | 0.12 | 0.83 | 0.01 | 0.28 | 0 | 0.29 | 0.21 | 13.27 | 10.95 | | C | B |

Furthermore, Pa and Ya were calculated for the respective specimens in Table 1 and their magnitude was compared. In Table 1, a check mark is entered in the "Pa<Ya" column for the specimens satisfying Pa<Ya. Referring to Table 1, it is shown that none of specimens Nos. 33 to 36 and 38 satisfy Pa<Ya. The range of the component of the elements of No. 38 falls within the range of the present invention, but No. 38 is Comparative Example in which Pa>Ya.

Before the bead-on-plate test, the test surface of the specimens was smoothed by mechanical processing by a grinder. The test surface constitutes a welding groove and a part affected by heat.

Furthermore, the test surface of the respective specimens was subjected to liquid penetrant testing to see that the test surface was free from cracking.

The specimens which were found to have a sound test surface were subjected to a bead-on-plate test by TIG welding in the condition shown in Table 2. The bead was a straight bead, and the bead length was 50 to 100 mm.

TABLE 2

| Order | Filler metal | Thickness of specimen | Current | Rate | Others |
|---|---|---|---|---|---|
| Method A | Not used | 25 mm or less | 150 A | 150-200 mm/ minute | Straight bead |
| | | 25 mm or more | 200 A | 150-200 mm/ minute | 50-100 mm |
| Method B | Used | 25 mm or less | 150 A | 150-200 mm/ minute | Straight bead |
| | | 25 mm or more | 200 A | 150-200 mm/ minute | 50-100 mm |

For the order of carrying out the present test, a test according to method A was performed, and then if defects were found in the liquid penetrant testing, a test according to method B was performed.

Figure 2:
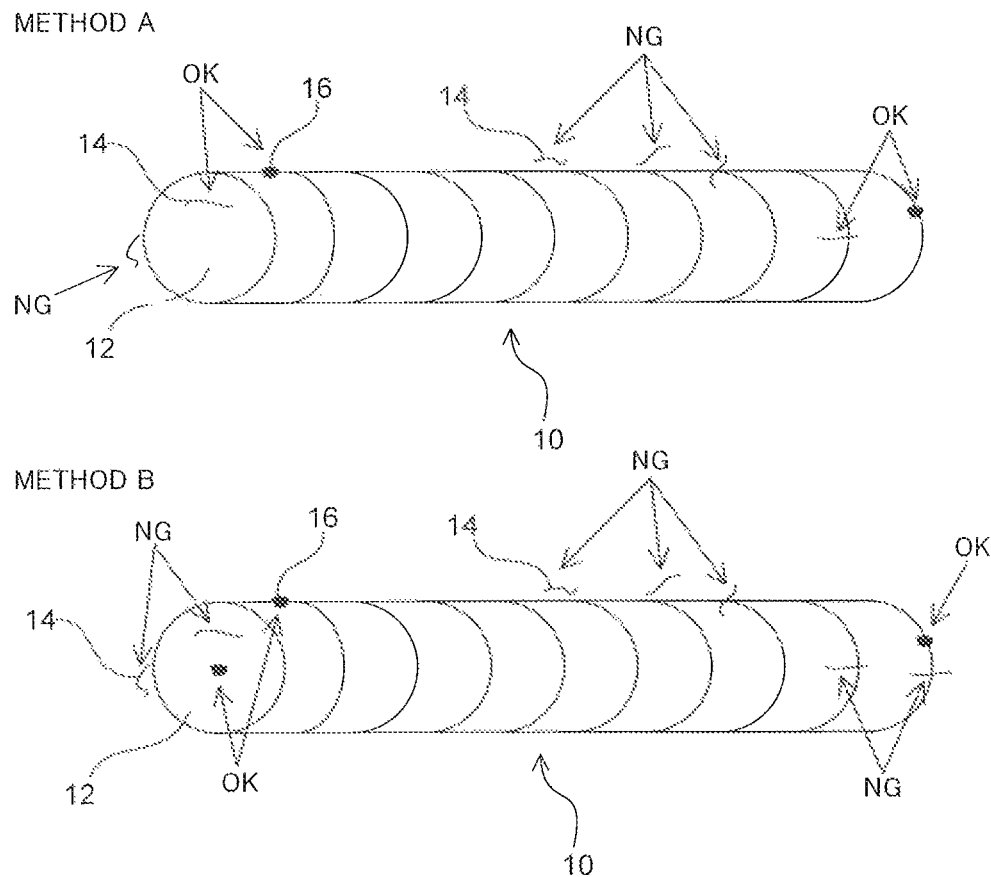
FIG. 2 shows an explanatory view illustrating criteria for evaluating cracking and dot defects used for the determination in a bead cracking test.

The criteria for evaluating beads according to method A (filler metal (welding rod), not used) and method B (filler metal, used) are shown in FIG. 2 and Table 3. In method B, the evaluation is "NG" even when cracks are very small.

TABLE 3

| Type of defects | Item of evaluation criteria | Method A | Method B |
|---|---|---|---|
| Cracking | Within bead | OK | NG |
| | Over bead and base material | NG | NG |
| | Occurred in base material | NG | NG |
| | In crater | OK | NG |
| Dot defects on sides of bead | | OK | OK |

As the results of the above test, specimens in which no defects were found in both specimens having a thickness of 25 mm or less and specimens having a thickness of 25 mm or more according to method A were rated as "A" for cracking properties; specimens in which defects were found by method A but defects were not found by method B were rated as "B" for cracking properties; and specimens in which defects were found even by method B were rated as "C" for cracking properties. The results are shown in "Cracking properties" in Table 1.

Referring to Table 1, while all of specimens Nos. 11 to 23, which were Inventive Examples, were rated as "A" or "B" for cracking properties, all of specimens Nos. 31 to 38, which were Comparative Examples, were rated as "C" for cracking properties.

Comparative Examples satisfy Pa<Ya, but they are rated as "C" for cracking properties as shown in Nos. 31, 32 and 37. This shows that the rating of cracking properties of those which are out of the range of the component of the present invention is not improved even if Pa<Ya is satisfied.

In particular, it is worth noting that specimen No. 38 in which the range of the component of the respective elements falls within the present invention is rated as "C" for cracking properties; this is because Pa is larger than Ya and Pa<Ya is not satisfied.

For cracking properties of the specimens, those rated as "A" or "B" were comprehensively rated as "A," and those rated as "C" were comprehensively rated as "C." The results are shown in "Rating" in Table 1. Referring to Table 1, all the specimens of Inventive Examples were rated as "A," and all the specimens of Comparative Examples were rated as "B."

Furthermore, a comparison between values of Pa and Ya of Inventive Examples and Comparative Examples shows that Pa is negative values and Ya is positive values in all of Inventive Examples. This can confirm that desirably Pa<0, Ya>0, and more desirably Ya>15.

The above description illustrates the present invention and should not be construed as limiting the invention according to the claims or limiting the scope of the invention. Furthermore, obviously the features of the present invention are not limited to those in Examples described above and may be modified in many ways within the technical scope described in the claims.

The heat-resistant alloy of the present invention may also be applied to products which require, for example, heat resistance and oxidation resistance, such as a kiln, a retort, a burner tube and a radiant tube in addition to the reaction tube according to the above embodiments.

REFERENCE SIGNS LIST

10 Bead
12 Crater
14 Cracking
16 Dot defects

The invention claimed is:

1. A heat-resistant alloy comprising,
in terms of % by mass,
C: 0.35% to 0.7%,
Si: more than 0% and 1.5% or less,
Mn: more than 0% and 2.0% or less,
Cr: 22.0% to 36.0%,
Ni: 25.0% to 48.3%,
Al: 1.5% to 4.5%,
Ti: 0.01% to 0.6%, and the balance being Fe and inevitable impurities, wherein when $Pa = -11.1 + 28.1 \times C + 29.2 \times Si - 0.25 \times Ni - 45.6 \times Ti$, and $$Ya = -13.75 \times Al + 63.75,$$

$Pa < Ya$.

2. The heat-resistant alloy according to claim 1, further comprising,
in terms of % by mass,
a rare earth element (REM): 0.01% to 0.2%,
wherein the Pa is $$Pa = -11.1 + 28.1 \times C + 29.2 \times Si - 0.25 \times Ni - 45.6 \times Ti + 18.0 \times REM.$$

3. The heat-resistant alloy according to claim 2, further comprising,
in terms of % by mass,
Nb: 0.01% to 2.0%,
wherein the Pa is, $$Pa = -11.1 + 28.1 \times C + 29.2 \times Si - 0.25 \times Ni - 45.6 \times Ti + 18.0 \times REM - 16.6 \times Nb.$$

4. The heat-resistant alloy according to claim 3, further comprising,
in terms of % by mass,
at least one selected from the group of W: more than 0% and 1.0% or less and Mo: more than 0% and 0.5% or less.

5. The heat-resistant alloy according to claim 2, further comprising,
in terms of % by mass,
at least one selected from the group of W: more than 0% and 1.0% or less and Mo: more than 0% and 0.5% or less.

6. The heat-resistant alloy according to claim 2, wherein an Al oxide layer is formed on the surface.

7. The heat-resistant alloy according to claim 2, wherein the heat-resistant alloy is a centrifugally cast body.

8. The heat-resistant alloy according to claim 2, wherein the heat-resistant alloy is used in a high temperature atmosphere of 500° C. to 1150° C.

9. A reaction tube comprising a tubular body comprising the heat-resistant alloy according to claim 2.

10. The reaction tube according to claim 9, wherein the reaction tube is prepared by joining the tubular bodies to each other by welding.

11. The heat-resistant alloy according to claim 1, further comprising,
in terms of % by mass,
Nb: 0.01% to 2.0%,
wherein the Pa is, $$Pa=-11.1+28.1\times C+29.2\times Si-0.25\times Ni-45.6\times Ti-16.6\times Nb.$$

12. The heat-resistant alloy according to claim 11, further comprising,
in terms of % by mass,
at least one selected from the group of W: more than 0% and 1.0% or less and Mo: more than 0% and 0.5% or less.

13. The heat-resistant alloy according to claim 1, further comprising,
in terms of % by mass,
at least one selected from the group of W: more than 0% and 1.0% or less and Mo: more than 0% and 0.5% or less.

14. The heat-resistant alloy according to claim 1, wherein an Al oxide layer is formed on the surface.

15. The heat-resistant alloy according to claim 1, wherein the heat-resistant alloy is a centrifugally cast body.

16. The heat-resistant alloy according to claim 1, wherein the heat-resistant alloy is used in a high temperature atmosphere of 500° C. to 1150° C.

17. A reaction tube comprising a tubular body comprising the heat-resistant alloy according to claim 1.

18. The reaction tube according to claim 17, wherein the reaction tube is prepared by joining the tubular bodies to each other by welding.

* * * * *